United States Patent [19]

Harrell et al.

[11] 4,265,415

[45] May 5, 1981

[54] EMERGENCY RELEASE DEVICE FOR SEAT BELT RETRACTOR

[75] Inventors: Terry R. Harrell; Robert C. Pfeiffer, both of Rochester, Mich.

[73] Assignee: Allied Chemical Corporation, Morris Township, Morris County, N.J.

[21] Appl. No.: 30,193

[22] Filed: Apr. 16, 1979

[51] Int. Cl.³ ........................ A62B 35/02; B65H 75/48

[52] U.S. Cl. ................................................ 242/107.4 A

[58] Field of Search .................. 242/107.4 R-107.4 E; 280/803, 806-808; 297/478, 480

[56] References Cited

U.S. PATENT DOCUMENTS

| | | | |
|---|---|---|---|
| 3,386,683 | 6/1968 | Howland | 242/107.4 A |
| 3,692,328 | 9/1972 | Arlauskas et al. | 280/803 |
| 3,771,814 | 11/1973 | Hahn | 280/803 |
| 3,866,944 | 2/1975 | Takahashi | 280/803 |
| 4,090,735 | 5/1978 | Czernakowski | 242/107.4 A |

*Primary Examiner*—John M. Jillions

*Attorney, Agent, or Firm*—Roger H. Criss

[57] ABSTRACT

An emergency release for a seat belt retractor, especially for use in passive seat belt systems, which includes a handle rotatable from a first position to a second position so as to move a contact surface into engagement with a ratchet tooth of a ratchet wheel when the vehicle is in an other than normal orientation. Rotation of the handle from its second to a third position rotates the ratchet wheel out of its engagement position. A contact member moves the pawl to its disengagement position and in one embodiment the pawl prevents the contact member from returning until the vehicle is in its normal orientation. In such embodiment, once the vehicle resumes its normal orientation, the contact member is automatically reset.

12 Claims, 5 Drawing Figures

28
18
12
14
10
68

30
28
43
20
18
72
70
42
34
68
36
66
12
38
20
24
26
A
B
14
32
64
22

EMERGENCY RELEASE DEVICE FOR SEAT BELT RETRACTOR

BACKGROUND OF THE INVENTION

1. Field of the Invention

This invention relates to improvements in seat belt retractors, and more specifically to an emergency release device for seat belt retractors.

2. Description of the Prior Art

Seat belt retractors in use today include a locking mechanism for preventing extension of seat belt webbing in emergency situations. Such situations may arise in response to a collision or rapid deceleration of the vehicle, or as a result of the vehicle assuming an orientation other than upright. This latter circumstance may arise should the vehicle veer off the road into a ditch, for example. In seat belt systems of the so called "active" type which typically include a seat belt buckle assembly, in the event the locking mechanism of the retractor should jam as a result of the collision or be in a non-releasable position as a result of the vehicle orientation, the occupant can release himself by opening the buckle. However, seat belt systems of the so called "passive" type often do not include a releasable buckle and release of the occupant, especially in situations in which the vehicle is in an other than normal orientation, may be difficult. Some passive seat belt systems that have been proposed include a connection of the seat belt to the vehicle door and should the vehicle result in an unusual orientation such that the retractor is locked against further protraction of the webbing, it may be difficult for the occupant to open the door and egress from the vehicle.

It would be desirable, therefore, if an emergency release mechanism were provided which permits egress from the vehicle in such situations.

SUMMARY OF THE INVENTION

In accordance with the present invention, there is provided, in a vehicle seat belt retractor comprising a shaft rotatable in the protraction and retraction directions; seat belt webbing associated with the shaft; locking mean actuable to prevent rotation of the shaft in the protraction direction, the locking means comprising a ratchet wheel, a pawl adapted to lockingly engage the ratchet wheel and a sensor for moving the pawl into locking engagement with the ratchet wheel, the sensor being sensitive to an orientation of the vehicle other than the normal upright orientation of the vehicle, the improvement comprising:

actuator means associated with the retractor and movable from a first position to a second position and from the second position to a third position;

contact means associated with the actuator means and having a ratchet wheel engaging surface, the contact means being movable into contact with the ratchet wheel upon movement of the actuator means from its first to second positions, the contact means operable to move the ratchet wheel in the retraction direction upon movement of the actuator means to its third position; and pawl release means movable from a disengagement position into engagement with the pawl and operable to move the pawl out of engagement with the ratchet wheel upon movement of the ratchet wheel in the retraction direction in response to movement of the contact means, whereby the shaft is free to rotate in the protraction direction to pay out the seat belt webbing.

Preferably, the pawl release means prevents the pawl from further engagement with the ratchet wheel until the sensor senses normal orientation of the vehicle. Also, the pawl release means is preferably provided with an automatic return mechanism which is operable when the vehicle is in its normal position so that inadvertent actuation of the actuator means will not prevent the pawl from moving to its locked position as a result of a subsequent vehicle deceleration or disorientation.

DESCRIPTION OF THE PREFERRED EMBODIMENTS

Figure 1:
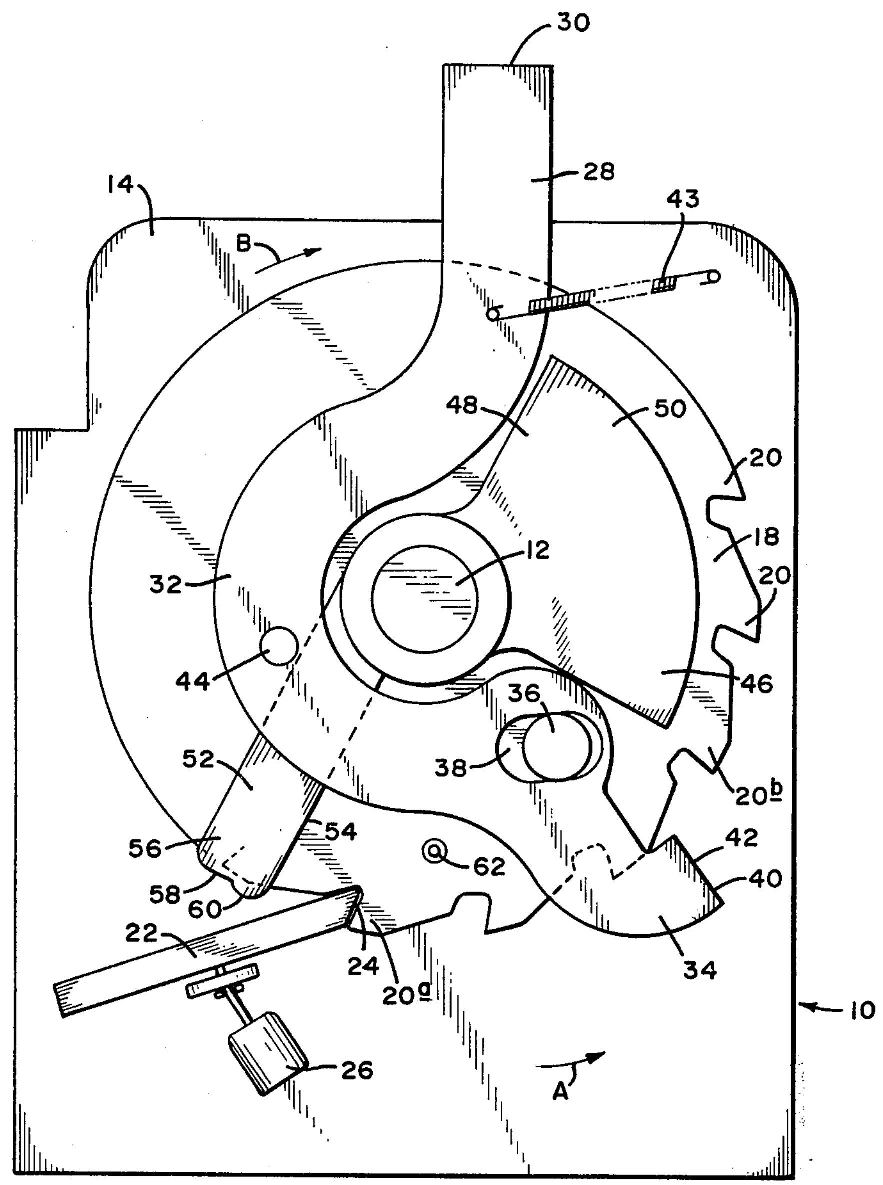
FIG. 1 is a cross-sectional view of a first embodiment of the present invention, with the actuator means in its inactive position.
Figure 2:
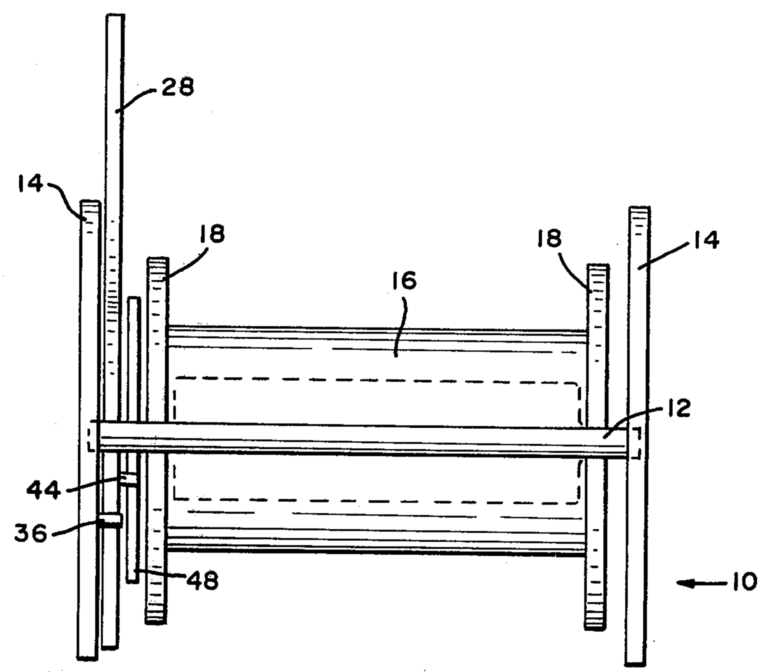
FIG. 2 is a front diagrammatic view of the retractor of FIG. 1.
Figure 3:
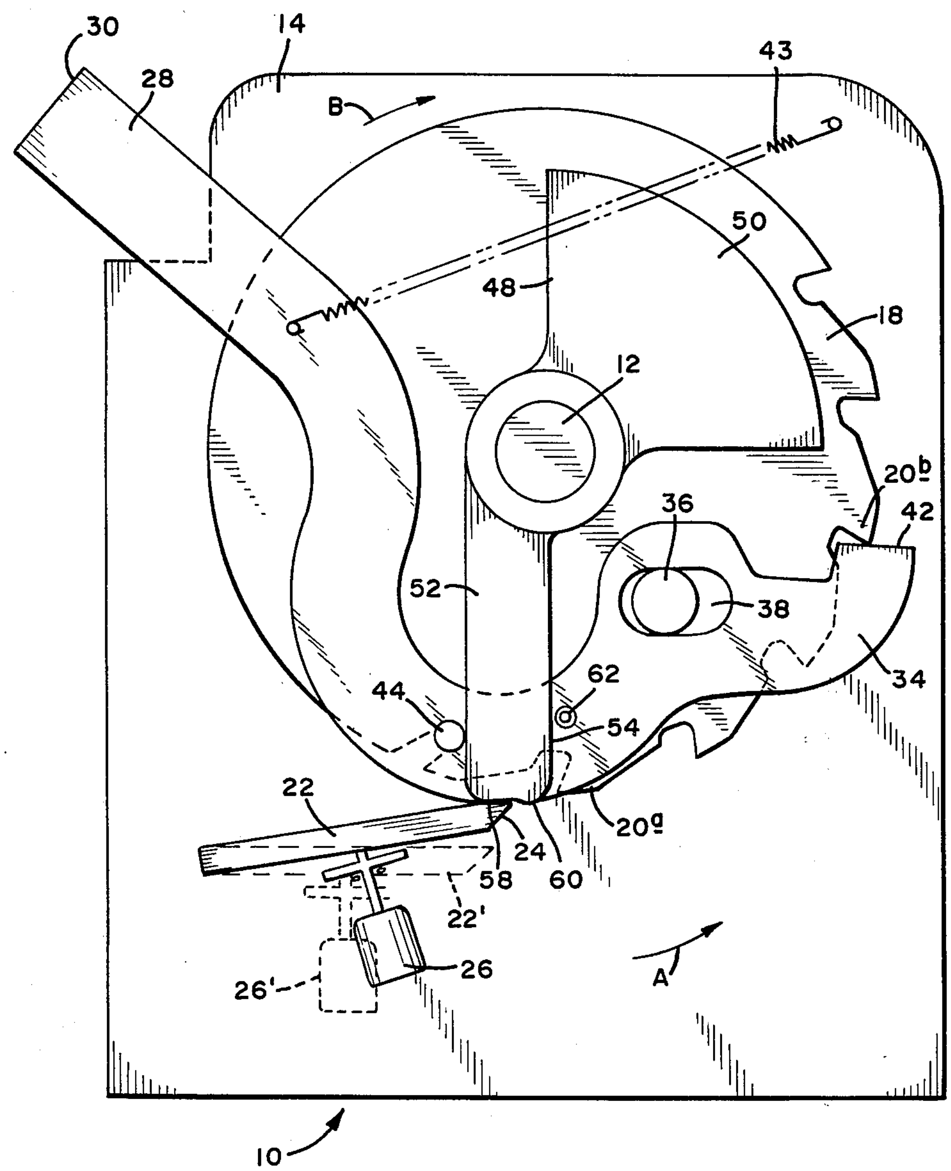
FIG. 3 is a view similar to FIG. 1 but with the actuator means in its active position.

With reference to the embodiment shown in FIGS. 1–3, there is shown a conventional seat belt retractor 10 having a shaft 12 rotatably mounted in side flanges 14. Shaft 12 is provided with a spool (not shown) to which seat belt webbing 16 is attached. A conventional rewind spring (also not shown) is connected to shaft 12 and biases shaft 12 in the rewind direction (as indicated by arrow A). Webbing 16 may be extended in the protraction direction (as indicated by arrow B) against the bias of the rewind spring. Mounted on shaft 12 for rotation therewith is one or more ratchet wheels 18 having peripheral ratchet teeth 20 arranged to lock ratchet wheel 18 and hence shaft 12 against rotation in the protraction direction.

A pawl or locking dog 22 having a locking edge 24 is pivotally mounted on retractor 10 and is movable into engagement with ratchet teeth 20 upon the influence of a vehicle sensitive sensor 26. Any type of sensor which is actuable in response to deceleration of the vehicle as well as disorientation of the vehicle may be employed. In the embodiment shown in the drawings, sensor 26 is in the form of a pendulum but other types of sensors such as a ball and cup sensor, an inverted pendulum, etc. may alternatively be used. Pawl 22 and sensor 26 are shown diagrammatically in the figures for simplicity.

In accordance with the present invention, a conventional seat belt retractor as described above is provided with an actuator means 28 shown in the form of a pivotable handle. Handle 28 has a distal end 30 adapted for manual actuation by the occupant, an intermediate arcuate portion 32 and an opposite end 34. Handle 28 is pivoted on pin 36 provided on side flange 14 and extends through slot-like opening 38 located between intermediate portion 32 and end 34. Due to the size of opening 38 in relation to the size of pin 36, handle 28 is adapted not only to pivot but also to laterally shift with respect to the pivot axis of shaft 12. Opposite end 34 of handle 28 is provided with a contact means 40 having a ratchet wheel engaging surface 42, shown as a generally planar surface. Handle 28 is connected at a location between end 30 and intermediate portion 32 to a coil (or other type) spring 43 which has its other end attached to flange 14. Spring 43 biases handle 28 to its normal, inactive position shown in FIG. 1.

A post 44 on intermediate portion 32 of handle 28 is adapted to contact a portion of pawl release means 46 and rotate the same. Pawl release means 46 is in the form of cam 48 mounted for rotation on shaft 12. Cam 48 is counter-balanced by providing a larger, segment-shaped upper portion 50 and a smaller, finger-shaped lower portion 52. Lower portion 52 of cam 48 has an edge 54 adapted to be engaged by post 44 of handle 28 and a distal end 56 provided with a slightly rounded pawl engaging surface 58 and a mild cam face 60 adapted to retain pawl 22 as described below. A cam stop 62 provided on flange 14 limits rotation of cam 48.

In operation of the present invention, assuming that the vehicle is disoriented as shown in FIG. 1, pendulum 26 exerts its force against pawl 22 and urges locking edge 24 of pawl 22 into locking engagement with one of the ratchet teeth 20 (shown as tooth **20*a* in FIG. 1). This prevents rotation of shaft 12 in the protraction direction and therefore prevents pay out of the webbing. In order to release retractor 10 from such locked position, the occupant rotates handle 28 from its first, stored position where surface 42 is spaced from ratchet teeth 20 to its second position where surface 42 contacts one of the ratchet teeth (shown as tooth 20*b*) which is circumferentially spaced from ratchet tooth 20*a*. As handle 28 is rotated from its second position to its third position as shown in FIG. 3, ratchet wheel 18 is slightly rotated in the rewind direction due to the contact of surface 42 with a ratchet tooth 20*b*. Such rotation is sufficient to move ratchet tooth 20*a* which engages edge 24 of pawl 22 out of its lock position. As handle 28 is rotated, post 44 contacts cam edge 54 and cam 48 is rotated in the rewind direction. Pawl engaging surface 58 thereafter contacts pawl 22 and pivots the same downward and out of its lock position where pawl 22 then becomes ineffective to engage ratchet teeth 20. Such position is spaced radially beyond the circumference of teeth 20 but is above the normal, unlocked position of pawl 22 which is shown as 22'. As cam 48 is rotated further in the retraction direction, cam face 60 moves into contact with edge 24 of pawl 22; rotation of cam 48 is limited by cam stop 62**.

Once pawl 22 is moved out of its lock position, shaft 12 is free to rotate in the protraction direction so that the occupant may open the door of the vehicle while freely extending webbing 16 from retractor 10 and egress from the vehicle. Once pawl edge 24 is in contact with cam face 60, handle 18 is released and springs back to its normal, inactive position due to the bias of spring 43. Since pendulum 26 is still acting on pawl 22 and urging it to pivot towards its lock position, pawl edge 24 remains in contact with cam face 60 and thus prevents cam 48 from rotating back to its original position. This ensures that the retractor remains unlocked until such time as the vehicle assumes its normal orientation.

Assuming now that the vehicle is returned to its normal orientation, pendulum 26 assumes the position indicated at 26' and no longer urges pawl 22 towards ratchet wheel 18. As a result, pawl edge 24 is pivoted due to gravity out of engagement with cam face 60 which thereby frees cam 48. Cam 48 then rotates in the direction of arrow B back to its original position due to its counter-balancing feature.

As can be seen, the present invention provides an emergency release mechanism which when inadvertently activated by movement of the handle when the vehicle is still in normal orientation, immediately returns the handle to its normal position and will not influence retractor operation. The present invention also provides automatic return of the pawl release means to its original position upon the return of the vehicle to its normal orientation. Also, once the pawl is disengaged from the ratchet wheel when the vehicle is in an other than normal orientation, the pawl is prevented from further engagement with the ratchet wheel until the sensor senses a return of the normal orientation and thereafter release the pawl lock out feature. In addition, the present invention provides a device which only requires a relatively low force to activate the release mechanism and would be able to absorb distortion and still be operable in the event of a severe crash. Although in the embodiment described above a manually operable handle 18 has been utilized, it is apparent that other mechanisms may be employed such as a push-pull cable or the like. Alternatively, a remote actuation, electrical or otherwise, may be utilized to actuate handle 18.

Figure 5:
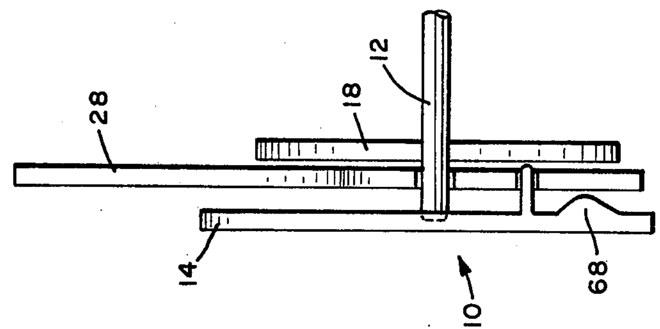
FIG. 5 is a partial front view of the embodiment of FIG. 4.
Figure 4:
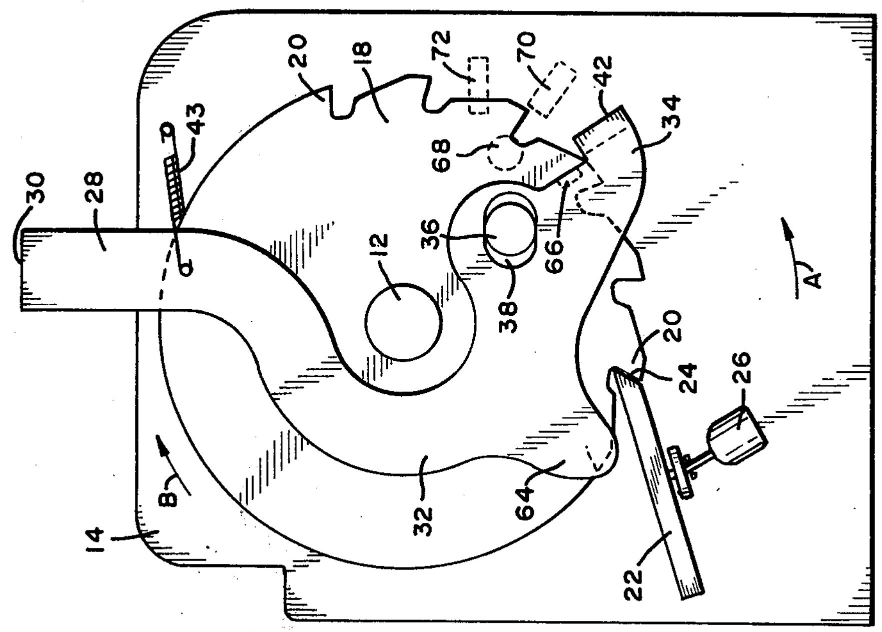
FIG. 4 is a cross-sectional view of a second embodiment of the present invention.

An automatic reset feature may not be desired in certain designs and such an embodiment is shown in FIGS. 4 and 5. In this embodiment, a separate pawl release means is not provided but instead a pawl engaging cam finger 64 is integrally provided on intermediate portion 32 of handle 28. A ramp surface 66 is provided adjacent end 34 of handle 18 on the handle surface which faces flange 14. Flange 14 has a detent 68 over which ramp surface 66 is adapted to move.

In operation, with the vehicle being in an other than normal orientation and pawl 22 being engaged with a ratchet tooth 20, the occupant may disengage the retractor by rotating handle 28 in the counterclockwise direction. Handle 28 rotates from its first position to its second position (shown at 70 in dotted lines) at which surface 42 contacts a ratchet tooth and ratchet wheel 18 is thus rotated in the same (retraction) direction so that pawl 22 is freed. Cam finger 64 contacts pawl 22 as handle 28 is thus rotated. Further rotation of handle 28 in the retraction direction causes cam finger 64 to force pawl 22 downward and outside the periphery of ratchet wheel 18. As handle 28 is rotated to this third position (indicated at 72 in dotted lines), ramp surface 66 rides over detent 68 and the latter prevents handle 28 from returning from its third position. Since pawl 22 is prevented from engaging ratchet teeth 20, shaft 12 is no longer locked and the occupant can freely protract seat belt webbing from retractor 10. This permits opening of the vehicle door in systems in which the webbing is connected to the door. Handle 28 remains in its third position regardless of the vehicle orientation and may be manually released from detent 68 by rotation of handle 28 in the clockwise direction. Spring 43 returns handle 28 to its first position (in the event of inadvertent actuation) except when handle 28 has been rotated into its third position.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. In a vehicle seat belt retractor comprising a shaft rotatable in the protraction and retraction directions;

seat belt webbing associated with said shaft; locking means actuable to prevent rotation of said shaft in said protraction direction, said locking means comprising a ratchet wheel, a pawl adapted to lockingly engage said ratchet wheel and a sensor for moving said pawl into locking engagement with said ratchet wheel, said sensor being sensitive to an orientation of said vehicle other than the normal upright orientation of said vehicle, the improvement comprising:

actuator means associated with said retractor and movable from a first position to a second position and from said second position to a third position;

contact means associated with said actuator means and having a ratchet wheel engaging surface, said contact means being movable into contact with said ratchet wheel upon motion of said actuator means from said first to second positions of said actuator means, said contact means operable to move said ratchet wheel in said retraction direction upon movement of said actuator means to said third position of said actuator means; and pawl release means movable from a disengagement position into engagement with said pawl and operable to move said pawl out of engagement with said ratchet wheel upon movement of said ratchet wheel in said retraction direction in response to said movement of said contact means, whereby said shaft is free to rotate in said protraction direction to pay out said seat belt webbing.

2. The device as claimed in claim 1 including means to automatically return said pawl release means to its disengagement position upon vehicle assuming its normal upright orientation.

3. A device as claimed in claim 2 wherein said pawl release means comprises means to retain said pawl release means in its engagement position by contact with said pawl while said pawl is actuated on by said sensor.

4. A device as claimed in claim 3 wherein said pawl release means comprises a member rotatable on said shaft.

5. A device as claimed in claim 4 wherein said member is counter-balanced, thereby providing said means to automatically return said pawl release means.

6. A device as claimed in claim 5 wherein said means to retain said pawl release means comprises a cam face provided on said rotatable member and engageable with said pawl.

7. A device as claimed in claim 6 including a post on said actuator means adapted to contact said rotatable member, whereby said rotatable member is moved into its engagement position with said pawl upon movement of said actuator means from its second position to its third position.

8. A device as claimed in claim 7 including means biasing said actuator means to its first position.

9. The device as claimed in claim 8 wherein said ratchet wheel includes ratchet teeth engageable by said pawl.

10. The device as claimed in claim 9 wherein said actuator means comprises a handle.

11. The device as claimed in claim 10 wherein said contact means is provided on one end of said handle.

12. The device as claimed in claim 1 wherein said pawl release means is provided on said actuator means.

* * * * *